United States Patent [19]
Oh

[11] Patent Number: 4,538,590
[45] Date of Patent: Sep. 3, 1985

[54] COOKWARE HAVING INTEGRALLY FORMED NATURAL STONE BOTTOMS AND METHOD OF MANUFACTURING THE SAME

[75] Inventor: Chang H. Oh, Seoul, Rep. of Korea

[73] Assignee: J & L Importers, Inc., King of Prussia, Pa.

[21] Appl. No.: 666,820

[22] Filed: Oct. 31, 1984

[30] Foreign Application Priority Data

May 22, 1984 [KR] Rep. of Korea ........................... 4702

[51] Int. Cl.³ .............................................. A47J 27/00
[52] U.S. Cl. ..................................... 126/390; 220/3.1; 126/246
[58] Field of Search ............... 126/390, 246, 207, 400, 126/373; 220/66, 3.1

[56] References Cited

U.S. PATENT DOCUMENTS

| | | | |
|---|---|---|---|
| 120,233 | 10/1871 | Beardsley | 126/246 |
| 213,904 | 4/1879 | Jarvis | 126/246 |
| 230,199 | 7/1880 | Sawyer | 126/246 |
| 2,719,413 | 10/1955 | Panzer | 126/246 |

FOREIGN PATENT DOCUMENTS

| | | | |
|---|---|---|---|
| 6834 | 5/1919 | Fed. Rep. of Germany | 126/390 |
| 556817 | 7/1932 | Fed. Rep. of Germany | 126/390 |
| 946464 | 6/1949 | France | 126/390 |
| 53957 | 9/1942 | Netherlands | 126/390 |
| 153782 | 6/1932 | Switzerland | 126/390 |

*Primary Examiner*—Randall L. Green
*Attorney, Agent, or Firm*—Woodcock, Washburn, Kurtz, Mackiewicz & Norris

[57] ABSTRACT

Improved cookware is disclosed having non-ferrous metal sidewalls and a natural stone bottom central portion. The non-ferrous metal sidewalls preferably are formed of an aluminum alloy having a coefficient of thermal expansion substantially equal to the coefficient of thermal expansion of the natural stone bottom. The natural stone bottom preferably comprises an iron-rich amphibole rock, and in the particularly preferred embodiment comprises hornblende.

5 Claims, 4 Drawing Figures

COOKWARE HAVING INTEGRALLY FORMED NATURAL STONE BOTTOMS AND METHOD OF MANUFACTURING THE SAME

FIELD OF THE INVENTION

The present invention relates in general to improved cookware and, in particular, relates to cookware having improved non-sticking, non-scorching and heat retention characteristics.

With prior art cooking utensils, especially fry pans, the sticking of food stuffs to the cooking surface has been a long-standing problem. Accordingly, over the years, non-ferrous metal cookware has been improved to include suitable non-stick coatings such as polytetrafluoroethylene, which is sold under the tradename Teflon by E.I. duPont deNemours & Company. However, as is well known, many non-stick coatings may be worn from the cooking surfaces by abrasion after long use, thereby diminishing their non-sticking capabilities.

Still another long-standing problem associated with prior art cooking utensils concerns the heat retention capabilities of the utensils themselves. Prior art cooking utensils are typically made of non-ferrous metals such as aluminum which conduct heat rapidly such that when the pan or utensil is placed adjacent to a source of heat, the pan uniformly reaches the desired temperature in a rather short period of time. When the cooking utensils, however, are removed from the source of heat, they cool to room temperature in a correspondingly short period of time. Accordingly, because prior art non-ferrous cooking utensils cool rapidly, they are not typically suited for use as serving dishes because the cooked food cools too rapidly.

Because of the poor heat retention characteristics of prior art cookware, food warmers have been utilized to maintain prepared foods at elevated temperatures during the course of a meal. Early food warmers were dangerous because they relied upon an open flame as a heat source. Later food warmers, however, relied upon electric heating means to maintain the desired temperature.

It would be desirable to provide cooking utensils which do not suffer from the aforementioned disadvantages. Specifically, it would be desirable to provide cooking utensils which have a non-abrading, non-stick surface, and it is an object of the present invention to provide such an improved cooking utensil.

It would also be desirable to provide improved cookware having a non-stick surface which has improved heat retention properties such that the utensil may be used for serving foods prepared therein, and for keeping those foods at elevated temperatures for extended periods of time. Still further, it would be desirable to provide a food warmer which did not rely upon an open flame as a source of heat and which also enjoyed the benefits of a non-stick food warming surface.

The present invention solves the aforementioned disadvantages by providing improved cookware having a bottom portion made of a natural stone material. It has been found that the natural stone bottom cookware of the present invention has particularly desirable non-stick characteristics. Moreover, the natural stone utilized for the bottom of the cookware of the present invention has excellent heat retention properties such that foods prepared therein maintain elevated temperatures for extended periods of time. Still further, the natural stone bottom portion of the cookware has a desirable appearance to consumers.

The natural stone bottom cookware of the present invention not only enjoys the aforementioned advantages attributable to the use of the non-sticking and heat retention characteristics of natural stone, but also retains certain advantages of prior art metal cookware. Specifically, the natural stone bottom cookware of the present invention is formed with a natural stone bottom integrally united with a non-ferrous metal sidewall. Accordingly, the cookware of the present invention not only enjoys the non-sticking and heat retention characteristics of natural stone, but also is relatively lightweight. The present invention, therefore, enjoys certain of the advantages of metal cookware.

The cookware of the present invention is characterized by the provision of a non-ferrous metal sidewall which is preferably formed of an alloy of aluminum. The cooking utensil is further provided with a bottom portion formed of a natural stone having a coefficient of thermal expansion substantially equal to the coefficient of thermal expansion of the aluminum alloy sidewall. In the preferred embodiment of the present invention, the natural stone bottom of the cooking utensil preferably comprises an iron-rich amphibole rock. In the particularly preferred embodiment, the amphibole rock comprises hornblende. It has been found that hornblende may be subjected to thermal shock of the type normally encountered in the use of cooking utensils without breaking or cracking. Moreover, it has been found that hornblende may be integrally joined with aluminum alloy to form a composite article having a strong mechanical juncture between the stone bottom and the aluminum alloy sidewalls of the cooking utensil.

In accordance with one embodiment of the present invention, the improved cooking utensil comprises a generally cylindrical body formed of aluminum alloy having a radially inwardly projecting lip at the bottom thereof. The natural stone bottom portion of the utensil comprises hornblende rock having a radially outwardly projecting lip which mates with the radially inwardly projecting lip of the cylindrical sidewall. The lips of the respective sidewall and bottom portions of the utensil mate with respect to each other so as to form a composite structure having substantial mechanical strength.

BRIEF DESCRIPTION OF THE DRAWINGS

The present invention will be more fully understood by reference to the accompanying drawings, in which.

DETAILED DESCRIPTION OF THE PREFERRED EMBODIMENT

Figure 1:
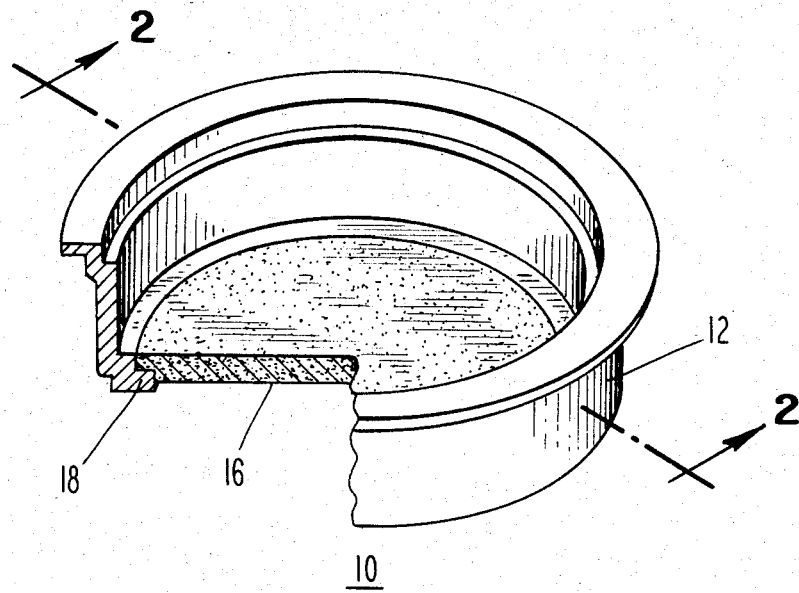
FIG. 1 is a perspective view of the cooking utensil of the present invention.
Figure 2:
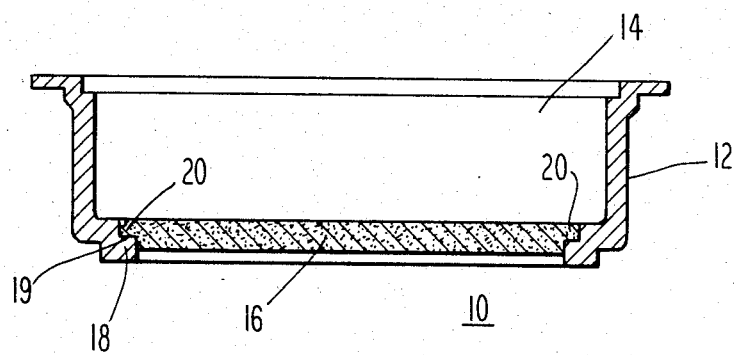
FIG. 2 is a cross-sectional view of the cooking utensil of FIG. 1 taken along section lines 2—2.

Referring now to FIGS. 1 and 2, the present invention will be fully described in detail.

In FIG. 1, the cooking utensil in accordance with the present invention is shown generally at 10. The utensil 10 includes a metal sidewall 12. As shown in FIGS. 1 and 2, the sidewall 12 is a cylindrical body which is open at the top 14 thereof. The utensil 10 further includes a bottom portion 16 which is formed of a natural stone material. As shown in the embodiment of FIG. 1, the bottom portion 16 of the utensil preferably comprises a circular stone member. The cylindrical sidewall 12 of the utensil 10 includes a radially inwardly extending peripheral lip 18. The lip 18 of the sidewall 12 includes an upper surface 19. As shown in the embodiment of FIG. 1 and FIG. 2, the circular bottom portion 16 includes a radially outwardly extending lip portion 20. The radially outwardly extending peripheral lip 18 of the circular bottom portion 16 includes a lower surface which mates with the upper surface 19 of the sidewall 12. The circular bottom portion 16 and the sidewall portion 12 of the utensil 10 are joined together in a manner to be described below so as to form a strong mechanical juncture between the bottom 16 and sidewall 12 of the utensil 10.

In accordance with an important aspect of the present invention, the sidewall 12 of the utensil is formed of an aluminum alloy. In accordance with the most important aspect of the present invention, the natural stone bottom portion 16 of the utensil 10 is formed of a particular type of stone having a coefficient of thermal expansion substantially equal to the coefficient of thermal expansion of the aluminum alloy forming the sidewall 12.

After an extensive program of trial and error, it has been found that iron rich amphibole rock in generally and specifically the particular amphibole known as hornblende have a coefficient of thermal expansion substantially equal to the coefficient of thermal expansion of aluminum. The terms "amphibole" and "hornblende" as used in this application, are as defined in the McGraw-Hill Encyclopedia of the Geological Sciences, 1978 edition. As so defined, amphibole rock means the inosilicate mineral assemblage having the generalized formula:

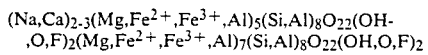

Hornblende, as there defined, is the general name given to the monoclinic calcium amphiboles that form extensive solid-solution series between the various metals in the generalized formula $(Ca,Na)_2(Mg,Fe,Al)_5(Al,Si)_8O_{22}(OH,F)_2$. It is also believed that, in addition to hornblende, serpentine rock may also be suitable. Serpentine rock is a hydrous magnesium silicate mineral assemblage of the rock serpentinate.

In the manufacture of the utensil 10 of the embodiment of FIGS. 1 and 2, the hornblende rock is cut into a columnar formation by techniques well known in the art. The column of hornblende rock so extracted is then sliced into a plurality of disk shaped members with a diamond cutter. A lathe is used to form the radially outwardly extending peripheral lip 20 of the bottom portion 16. The aluminum alloy to be used from the sidewalls 12 is heated to a temperature of about 700° C. to a melt condition. The disk shaped bottom portion 16 is also heated to a temperature of about 200°–300° C. for a period of about 10 minutes for stress relief. Thereafter, the disk shaped bottom portion 16 is placed in a furnace for approximately 5 minutes and heated to a temperature of 700° C. Thereafter, the molten aluminum alloy is cast about the stone bottom portion 16 to form the integral cooking utensil unit shown in FIGS. 1 and 2.

It has been found that failure to follow the aforementioned procedure may result in cracking and breaking of the bottom portion 15 when the aluminum alloy sidewalls 12 are cast, or alternatively, when the completed utensil is subjected to thermal shock during use.

It has also been found that care must be taken not only in selecting the rock utilized for the formation of the bottom portion 16, but also in selecting the aluminum alloy of the sidewalls 12 to insure that the coefficient of thermal expansion of the bottom portion 16 and sidewalls 12 are substantially the same. As mentioned above, the preferred rock to be utilized is hornblende. The preferred aluminum alloy is not a standard or common casting alloy, but is instead one which includes the following constituents:

| Element | Sample Percent |
| --- | --- |
| Silicon | 2.95 |
| Copper | 1.80 |
| Magnesium | 0.068 |
| Zinc | 1.22 |

Figure 3:
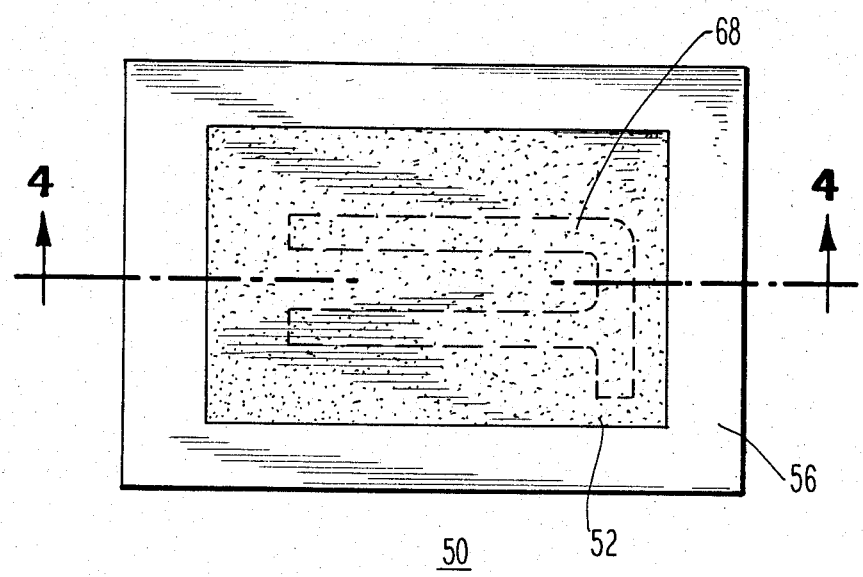
FIG. 3 is a top view of a food warming utensil representative of a second embodiment of the present invention.
Figure 4:
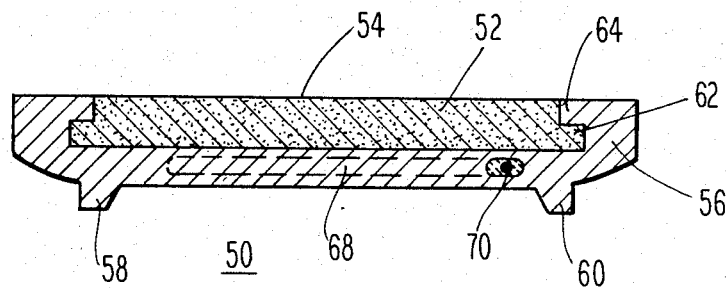
FIG. 4 is a cross-sectional view of the food warming utensil of FIG. 3 taken along section lines 4—4.

Referring now to FIG. 3, an alternative embodiment of the present invention in the form of a food warming utensil 50 will be seen. This embodiment is described and claimed in copending application Ser. No. 661,580, filed Oct. 16, 1984, which is assigned to the assignee of the present invention. The food warming utensil is shown in general at 50. The food warming utensil of FIG. 3 includes a central body portion 52. An upper surface 54 (FIG. 4) of the central body portion 52 is used for supporting and warming food stuffs. Substantially surrounding the central body portion 52 is a metal base portion 56. The metal base portion 56 surrounds the central stone body portion 52 on all sides except for the upper or food warming surface 54 thereof. The metal base portion 56, in accordance with the present invention, has a coefficient of thermal expansion substantially equal to the coefficient of thermal expansion of the central body portion 52. The metal base portion 56 is formed of cast aluminum alloy and includes a pair of vertically depending legs 58 and 60 as shown in FIG. 4. As in the embodiment shown in FIGS. 1 and 2, the central body portion 52 of the food warming utensil 50 includes an outwardly extending lip 62 whereas the metal base portion 56 includes an inwardly extending lip 64. The inwardly extending lip 64 of the metal base portion 56 overlies the outwardly extending lip 62 of the central body portion 52 so as to form a strong mechanical juncture between the central body portion and the metal base.

In accordance with an important aspect of the embodiment of FIGS. 3 and 4, the food warming utensil 50 includes a channel means 68 which traverses through the metal base portion 56 in a plane substantially parallel to the plane of the central body portion 52. Situated within the channel means 68 is an electric resistance heating means 70 which is utilized to supply electric resistance heating to the central body portion 52. A plug connector is provided such that electrical connection to the electric resistance heating means 70 may be made.

While particular embodiments of the present invention have been shown and described, it is to be understood that, within the scope of the appended claims, the invention may be practiced otherwise than as specifically illustrated and described.

What is claimed is:

1. A method of forming a cooking utensil comprising the steps of:

(a) providing a substantially flat bottom portion of natural stone;
(b) machining said natural stone bottom portion to form an outwardly extending peripheral lip about the perimeter thereof;
(c) heating said bottom portion to a temperature of from about 200° C. to about 300° C. for stress relief;
(d) thereafter heating said stress relieved bottom portion to a temperature of about 200° C. for a period exceeding four minutes;
(e) placing said bottom portion in a mold; and
(f) casting an aluminum alloy about said bottom portion to form a metal sidewall of said utensil, said bottom portion having a coefficient of thermal expansion substantially equal to the coefficient of thermal expansion of said metal sidewall.

2. The method of claim 1 wherein the step (c) of heating for stress relief is conducted for a time period exceeding five minutes.

3. The method of claim 2 wherein the step (c) of heating for stress relief is conducted for a period of about 10 minutes.

4. The method of claim 1 wherein the step (d) of heating said stress relieved bottom portion is conducted for a period of about five minutes.

5. The method of claim 1 wherein the step (a) of providing said bottom portion further comprises:
selecting a formation of hornblende rock;
forming a column of said rock; and
cutting said column to form said bottom portion.

* * * * *